United States Patent
Hoshiba et al.

(10) Patent No.: US 9,425,459 B2
(45) Date of Patent: *Aug. 23, 2016

(54) ELECTRODE FOR SOLID-STATE BATTERIES AND METHOD OF PREPARING THE ELECTRODE, SOLID-STATE BATTERY CONTAINING THE ELECTRODE, AND BONDING FILM USED FOR PREPARING THE ELECTRODE

(71) Applicant: Samsung Electronics Co., Ltd., Suwon-si, Gyeonggi-do (KR)

(72) Inventors: Koji Hoshiba, Yokohama (JP); Takanobu Yamada, Yokohama (JP)

(73) Assignee: SAMSUNG ELECTRONICS CO., LTD. (KR)

( * ) Notice: Subject to any disclaimer, the term of this patent is extended or adjusted under 35 U.S.C. 154(b) by 466 days.

This patent is subject to a terminal disclaimer.

(21) Appl. No.: 13/715,155

(22) Filed: Dec. 14, 2012

(65) Prior Publication Data

US 2013/0157143 A1    Jun. 20, 2013

(30) Foreign Application Priority Data

Dec. 15, 2011 (JP) .............. 10-2011-275013
Dec. 10, 2012 (KR) .............. 10-2012-0143033

(51) Int. Cl.
| | |
|---|---|
| H01M 4/62 | (2006.01) |
| H01M 4/64 | (2006.01) |
| H01M 10/02 | (2006.01) |
| H01M 4/13 | (2010.01) |
| H01M 4/02 | (2006.01) |
| H01M 4/131 | (2010.01) |
| H01M 10/052 | (2010.01) |
| H01M 10/0562 | (2010.01) |

(52) U.S. Cl.
CPC ............. *H01M 4/621* (2013.01); *H01M 4/13* (2013.01); *H01M 4/622* (2013.01); *H01M 4/64* (2013.01); *H01M 10/02* (2013.01); *H01M 4/02* (2013.01); *H01M 4/131* (2013.01); *H01M 10/052* (2013.01); *H01M 10/0562* (2013.01); *Y02E 60/122* (2013.01); *Y02P 70/54* (2015.11)

(58) Field of Classification Search
CPC .......... H01M 10/02; H01M 10/052; H01M 10/0562; H01M 4/02; H01M 4/13
USPC ........................................................... 429/304
See application file for complete search history.

(56) References Cited

U.S. PATENT DOCUMENTS

| | | | |
|---|---|---|---|
| 2001/0016290 A1 | 8/2001 | Kezuka | |
| 2009/0081553 A1* | 3/2009 | Kondo et al. | 429/314 |
| 2010/0291442 A1* | 11/2010 | Wang et al. | 429/231.95 |

FOREIGN PATENT DOCUMENTS

| | | |
|---|---|---|
| JP | 05013099 A | 1/1993 |
| JP | 09082311 A | 3/1997 |

(Continued)

*Primary Examiner* — Jonathan Jelsma
*Assistant Examiner* — Rashid Alam
(74) *Attorney, Agent, or Firm* — Cantor Colburn LLP

(57) ABSTRACT

Provided are an electrode for solid-state batteries, a method of preparing the electrode, a solid-state battery including the electrode, and a bonding film used for the method of preparing the electrode. The electrode for solid-state batteries include a bonding layer interposed between an electrode layer and a current collecting member and bound to the electrode layer, where the bonding layer includes a first binder which is inactive to the solid electrolyte, a second binder which has a stronger binding ability to the current collecting member than a bonding strength of the first binder to the current collecting member; and a bonding layer conductive material.

16 Claims, 3 Drawing Sheets

(56) References Cited

FOREIGN PATENT DOCUMENTS

| | | | |
|---|---|---|---|
| JP | 10125330 A | 5/1998 | |
| JP | 2002246029 A | 8/2002 | |
| JP | 2008257962 A | 10/2008 | |
| JP | 2009289534 A | 12/2009 | |
| JP | 2011134675 A | 7/2011 | |
| KR | 1020040036459 A | 4/2004 | |

* cited by examiner

ELECTRODE FOR SOLID-STATE BATTERIES AND METHOD OF PREPARING THE ELECTRODE, SOLID-STATE BATTERY CONTAINING THE ELECTRODE, AND BONDING FILM USED FOR PREPARING THE ELECTRODE

CROSS-REFERENCE TO RELATED APPLICATIONS

This application claims priority to Japanese Patent Application No. 2011-275013, filed on Dec. 15, 2011, and Korean Patent Application No. 10-2012-0143033, filed on Dec. 10, 2012, and all the benefits accruing therefrom under 35 U.S.C. §119, the contents of which in their entireties are herein incorporated by reference.

BACKGROUND

1. Field

The disclosure relates to an electrode for solid-state batteries, a method of preparing the electrode, a solid-state battery containing the electrode, and a bonding film used for preparing the electrode.

2. Description of the Related Art

As published in Japanese Patent Publication No.1998-125330, Japanese Patent Publication No.1993-13099, Japanese Patent Publication No. 2008-257962 and Japanese Patent Publication No. 2011-134675, as lithium ion secondary batteries, solid-state batteries using a solid electrolyte are known. Such solid-state batteries include an electrolyte layer including the solid electrolyte, electrodes (a positive electrode and a negative electrode) formed on both surfaces of the electrolyte layer, and a current collecting member attached to each of the electrodes. The solid-state batteries use solid electrolytes as the electrolytes thereof, and generally, the solid electrolyte is also mixed in each of the electrodes.

As a method of preparing solid-state batteries, a powder compression molding method includes adding powder materials that sequentially form each layer to a cylindrical container, compression molding the powder materials and sealing both ends of the container with current collecting members. However, when the powder compression molding method is used, an electrode area may not be efficiently increased as a different container and a different pressing apparatus are used based on a size of the electrode area, in which the electrode area means the area of which the electrode is in contact with the electrolyte layer. Thus, the powder compression molding method may not be efficiently used for increasing capacity of a solid-state battery.

Thus, a coating method of preparing a solid-state battery has been proposed that includes forming a coating composition for each layer by mixing a powder material of each layer, a binder and a solvent, forming a stacked structure by sequentially coating the coating composition on the current collecting member and drying, and rolling the stacked structure. The coating method of preparing a solid-state battery may easily increase the electrode area by simply enlarging the size of the coating areas of the electrode and the electrolyte layer.

However, characteristics of the solid-state battery prepared by the coating method may degrade when the solid electrolyte used is highly reactive, such as a sulfide-based solid electrolyte. Specifically, the sulfide-based solid electrolyte degrades as the sulfide-based solid electrolyte reacts with the binders or solvents used in the electrode of a lithium ion secondary battery which includes a non-aqueous liquid in the electrolyte thereof.

Therefore, Japanese Patent Publication No. 2011-134675 has proposed using a binder or a solvent that is inactive to a solid electrolyte. However, the electrode and the current collecting member may not be substantially bound, thus the current collecting member may be peeled off from the electrode during, for example, rolling of the electrode.

In addition, according to a technical feature disclosed in Japanese Patent Publication No. 2008-257962, a conductive layer is interposed between a current collecting member and an electrode layer, and the current collecting member and the conductive layer are bound with a conductive bonding material containing ethyl acetate. Ethyl acetate is a compound including a polar functional group. Therefore, the current collecting member and the conductive layer are expected to be sufficiently bound to each other. However, the technical feature disclosed in Japanese Patent Publication No. 2008-257962 does not use a binder in the positive electrode layer.

SUMMARY

Provided is an embodiment of an electrode for solid-state batteries where degradation of a solid electrolyte is effectively prevented and which bonds substantially strongly to a current collecting member.

Provided also is an embodiment of a solid-state battery containing the electrode for solid-state batteries.

Provided also is an embodiment of a bonding film used for preparing the electrode for solid-state batteries.

Provided also is an embodiment of a method of preparing the electrode for solid-state batteries.

Additional aspects will be set forth in part in the description which follows and, in part, will be apparent from the description, or may be learned by practice of the embodiments described herein.

According to an embodiment of the invention, an electrode for solid-state batteries includes: a current collecting member; an electrode layer bound on the current collecting member; and a bonding layer interposed between the electrode layer and the current collecting member and bound to the electrode layer, where the electrode layer includes a solid electrolyte, an electrode layer binder which is inactive to the solid electrolyte, and an electrode active material, where the bonding layer includes a first binder which is inactive to the solid electrolyte, a second binder that has a stronger bonding strength to the current collecting member than a bonding strength of the first binder to the current collecting member, and a bonding layer conductive material.

In an embodiment, the bonding layer in the electrode for solid-state batteries includes the first binder which is bound to the electrode layer, the second binder which has a stronger bonding strength to the current collecting member than a bonding strength of the first binder to the current collecting member, and the bonding layer conductive material; and is interposed between the current collecting member and the electrode layer. Thus, the first binder of the bonding layer binds to the electrode layer, and the second binder binds to the current collecting member. Also, the binder of the electrode layer is inactive to the solid electrolyte. The electrode binder may include the first binder. According to an embodiment of the invention, the first binder in the bonding layer and the first binder in the electrode layer interdiffuse with each other across the interface between the bonding layer and the electrode layer and thus the bonding layer may strongly bind to the electrode layer.

In an embodiment, the first binder may include a non-polar resin which does not have a polar functional group. According to an embodiment of the invention, the first binder is capable of being bound to the electrode layer strongly because the first binder may be formed of a non-polar resin which does not have a polar functional group.

Also, the second binder may be formed of a polar resin which has a polar functional group. According to the embodiment of the invention, the second binder is capable of being bound to the current collecting member strongly because the second binder may be formed of a polar resin which has a polar functional group.

According to another aspect of the invention, provided is a solid-state battery containing a positive electrode containing a positive electrode active material, a negative electrode containing a negative electrode active material, and a solid electrolyte layer disposed between the positive electrode and the negative electrode, where at least one of the positive electrode and the negative electrode includes a current collecting member; an electrode layer bound on the current collecting member; and a bonding layer interposed between the electrode layer and the current collecting member and bound to the electrode layer, where the electrode layer includes a solid electrolyte, an electrode layer binder which is inactive to the solid electrolyte, and an electrode active material, where the bonding layer includes a first binder which is inactive to the solid electrolyte, a second binder which has a stronger bonding strength to the current collecting member than a bonding strength of the first binder to the current collecting member, and a bonding layer conductive material. The solid-state battery may be an all-solid secondary battery.

According to another embodiment of the invention, provided is a bonding film for solid-state batteries which is bound to an electrode layer including a solid electrolyte, a binder which is inactive to the solid electrolyte, and an electrode active material, where the bonding film includes a first binder which is inactive to the solid electrolyte; a second binder which has a stronger bonding strength to a current collecting member than a bonding strength of the first binder to the current collecting member; and a bonding layer conductive material, where the bonding film is interposed between the electrode layer and the current collecting member.

An embodiment of the bonding film according to the invention, which is bound to the electrode layer, includes the first binder which is inactive to the solid electrolyte; the second binder which has a stronger bonding strength to the current collecting member than a bonding strength of the first binder to the current collecting member; and the bonding layer conductive material, and is interposed between the current collecting member and the electrode layer. In an embodiment, the electrode layer may further include an electrode layer conductive material.

According to another embodiment of the invention, provided is a method of preparing an electrode for solid-state batteries, the method includes forming a bonding layer by coating and drying a bonding layer coating composition on a current collecting member, where the bonding layer coating composition includes a first binder which is inactive to a solid electrolyte, a second binder which has a stronger bonding strength to a current collecting member than a bonding strength of the first binder to the current collecting member, a bonding layer conductive material, and a first solvent which dissolves the first binder and the second binder; and forming an electrode layer by coating and drying an electrode layer coating composition on the bonding layer, where the electrode layer coating composition includes the solid electrolyte, an electrode layer binder, an electrode active material, and a second solvent which dissolves the electrode layer binder and the first binder.

In an embodiment, the forming of the bonding layer includes coating and drying the bonding layer coating composition, which includes the first binder, the second binder, the bonding layer conductive material and the first solvent, on the electrode current collecting member to form the bonding layer. In an embodiment, the forming of the electrode layer includes coating and drying the electrode layer coating composition, which includes the solid electrolyte, the electrode active material, the electrode layer conductive material, the electrode layer binder and the second solvent, on the bonding layer to form the electrode layer. In such an embodiment, when the electrode layer coating composition is applied, the first binder in the bonding layer is dissolved by the second solvent and swollen into the electrode layer, thus bondage between the bonding layer and the electrode layer is much strengthened.

In an embodiment, the electrode layer coating composition may further include an electrode layer conductive material. In an embodiment, the second binder of the bonding layer binds to the current collecting member, and the electrode layer binder in the electrode layer is inactive to the solid electrolyte.

As described above, according to embodiments of the invention, the first binder of the bonding layer binds to the electrode layer, and the second binder of the bonding layer binds to the current collecting member. In such embodiments, the binder of the electrode layer is inactive to the solid electrolyte. Accordingly, embodiments of the electrode for solid-state batteries according to the invention may effectively prevent degradation of the solid electrolyte in the electrode layer and is capable of being strongly bound to the current collecting member.

BRIEF DESCRIPTION OF THE DRAWINGS

These and/or other features of the invention will become apparent and more readily appreciated from the following description of embodiments thereof, taken in conjunction with the accompanying drawings, in which.

DETAILED DESCRIPTION

Figure 1:
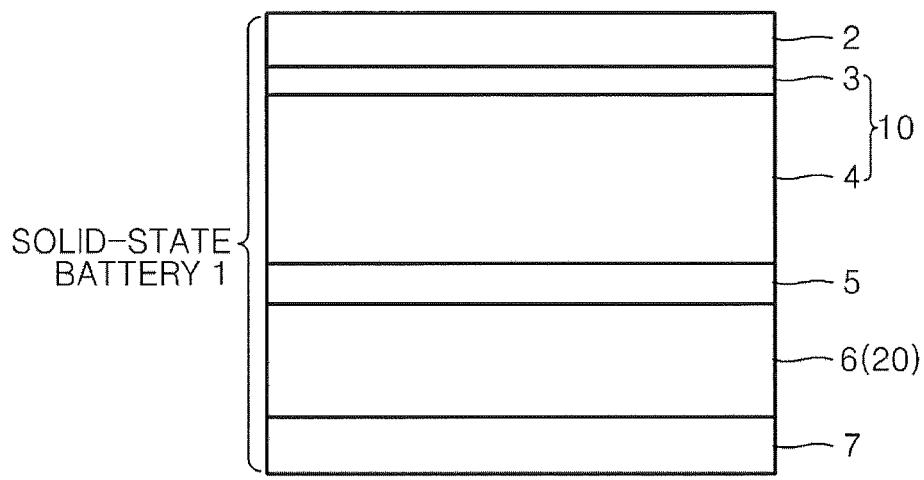
FIG. 1 is a cross-sectional view of an embodiment of a structure of a solid-state battery according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

1. A Solid-State Battery

First, an embodiment of a solid-state battery 1 according to the invention will be described with reference to FIG. 1. The solid-state battery 1 includes a positive electrode current collecting member 2, a bonding layer 3, a positive electrode layer 4, an electrolyte layer 5, a negative electrode layer 6 and a negative electrode current collecting member 7. In such an embodiment, a positive electrode 10 of the solid-state battery 1 includes the bonding layer 3 and the positive electrode layer 4, and a negative electrode 20 of the solid-state battery 1 includes the negative electrode layer 6.

The positive electrode current collecting member 2 may be a conductor, e.g., an electric conductor, including, for example, plates or sheets including aluminum (Al), stainless steel, a nickel-plated steel, indium (In), copper (Cu), magnesium (Mg), titanium (Ti), iron (Fe), cobalt (Co), nickel (Ni), zinc (Zn), germanium (Ge), lithium (Li), or any alloy thereof.

The bonding layer 3 bonds the electrode current collecting member 2 and the positive electrode layer 4. The bonding layer 3 includes a bonding layer conductive material, a first binder and a second binder. The bonding layer conductive material may be, for example, carbon black, such as ketjen black or acetylene black and the like, graphite, such as natural graphite or artificial graphite, carbon fibers, metal powders, or the like, but not limited thereto as long as the bonding layer conductive material increases conductivity of the bonding layer 3. The bonding layer conductive material describe above may be used individually or in combination of at least two thereof.

The first binder may be, for example, a non-polar resin that does not have a polar functional group. A polar functional group is a group that have electronegative atoms that impart the ability to undergo hydrogen bonding with other polar groups or aqueous solvents, such as a —OR, —COOR, —NR$_2$, —SR, —SO$_3$R, —C(O)—, phosphoric acid group, and the like, in which R is a hydrogen atom, a metal atom, an alkyl group or an aryl group. Thus, the first binder is inactive with respect to a highly reactive solid electrolyte, e.g., a sulfide-based solid electrolyte. The sulfide-based solid electrolyte is known for being active to acids, alcohols, amines, ethers, or the like. The first binder binds with the positive electrode layer 4. In such an embodiment, where the positive electrode 4 includes the first binder, the first binder in the bonding layer 3 and the first binder in the positive electrode layer 4 interdiffuse with each other across the interface between the bonding layer 3 and the positive electrode layer 4, and thus the bonding layer 3 may be substantially strongly bound to the positive electrode layer 4.

In an embodiment, the first binder may include, for example, styrene-based thermoplastic elastomers such as styrene-butadiene-styrene ("SBS") block copolymer and styrene-thylene-butadiene-tyrene ("SEBS") block copolymer, and styrene-styrene-butadiene-styrene ("SSBS") block copolymer; styrene-butadiene rubber ("SBR"), butadiene rubber ("BR"), natural rubber ("NR"), isoprene rubber ("IR"), ethylene-propylene-diene terpolymer ("EPDM"), and a partial or complete hydrogenated product thereof. In some embodiments, the first binder may include polystyrene, a polyolefin, an olefin-based thermoplastic elastomer, a polycycloolefin, a silicone resin, and the like. In Japanese Patent Publication No. 2008-257962, a conductive layer does not include a binder. Thus, bonding strength between the bonding layer 3 and the positive electrode layer 4 is stronger than bonding strength between a conductive binding material and the conductive layer in Japanese Patent Publication No. 2008-257962.

The second binder has a stronger bonding strength to the positive electrode current collecting member 2 than a bonding strength of the first binder to the positive electrode current collecting member 2. The strength of bonding to the positive electrode current collecting member 2 may be determined, for example, by measuring a force to peel off a binder film from the positive electrode current collecting member 2 using a peel tester, where the binder film is obtained from coating and drying a binder solution on the positive electrode current collecting member 2. In an embodiment, the second binder is, for example, a polar resin including a polar functional group that strongly binds to the positive electrode current collecting member 2 with hydrogen bond. In an alternative embodiment, the positive electrode layer 4 may not include the second binder when the second binder is highly reactive to a sulfide-based solid electrolyte. In an embodiment, the second binder include, for example, nitrile-butadiene rubber ("NBR"), chloroprene rubber ("CR"), and a partial or complete hydrogenated product thereof; polyacrylic acid ester copolymer, poly vinylidene fluoride ("PVDF"), vinylidene fluoride-hexafluoropropylene copolymer ("VDF-HFP"), and a modified product thereof with a carboxylic acid; a chlorinated polyethylene ("CM"), a polymetacrylic acid ester, polyvinylalcohol, an ethylene-vinyl alcohol copolymer, a polyimide, a polyamide, a polyamide imide, and the like. In some embodiments, the second binder may include a polymer that has a monomer unit having a carboxylic acid group, a sulfonic acid group, or a phosphoric acid group copolymerized to the first binder. In an embodiment, a content ratio of the bonding layer conductive material, the first binder and the second binder is not limited a specific content ratio. In one embodiment, for example, the bonding layer conductive material may be in a range from about 50 weight percent (wt %) to about 95 wt %, the first binder may be in a range from about 3 wt % to about 30 wt %, and the second binder may be in a range from about 2 wt % to about 20 wt % with respect to a total weight of the bonding layer 3.

The positive electrode layer 4 may include a sulfide-based solid electrolyte, a positive electrode active material, a positive electrode layer conductive material and a positive electrode layer binder. The positive electrode layer conductive material may be substantially the same as the bonding layer conductive material. In an embodiment, the sulfide-based solid electrolyte may be, for example, $Li_2S$—$P_2S_5$, $Li_{3.25}Ge_{0.25}P_{0.75}S_4$ (Thio-LISICON), $Li_2S$, $Li_2S$—$P_2S_5$, $Li_2S$—$SiS_2$, $Li_2S$—$GeS_2$, $Li_2S$—$B_2S_5$, and $Li_2S$—$Al_2S_5$. The sulfide-based solid electrolyte is known for having higher lithium ion conductivity than other inorganic compounds.

In an embodiment, the sulfide-based solid electrolyte may be obtained by, for example, heating a sulfides including $Li_2S$ and $P_2S_5$ to a temperature higher than melting points of $Li_2S$ and $P_2S_5$ to melt and mix $Li_2S$ and $P_2S_5$ at a predetermined ratio for a predetermined time, and quenching the mixture (a melt-quenching method). In an alternative embodiment, the sulfide-based solid electrolyte may be obtained by treating sulfides including $Li_2S$ and $P_2S_5$ by a mechanical milling method (a MM method). A mixing ratio of the sulfides including $Li_2S$ and $P_2S_5$ may be in a range from about 50:50 to about 80:20, or in a range from about 60:40 to about 75:25 in a molar ratio.

In an embodiment, the solid-state battery 1 includes an electrolyte that is a solid electrolyte, and thus the positive electrode layer 4 may include a solid electrolyte. In such an embodiment, the performance of the solid-state battery 1 may not degrade even without a solid electrolyte in the negative electrode layer 6 when a negative electrode active material include, e.g., is formed of, a graphite active material. Examples thereof will be described later in detail. Therefore, in an embodiment, the negative electrode layer 6 may not include a solid electrolyte. A solid electrolyte included in the positive electrode layer 4 may contain a lithium ion conductor that is formed of an inorganic compound as an inorganic solid electrolyte in addition to a sulfide-based solid electrolyte. In an embodiment, the lithium ion conductor includes, for example, $Li_3N$, lithium super ionic conductor ("LISICON"), $Li_{3+y}PO_{4-x}N_x$ ("UPON"), $Li_{3.25}Ge_{0.25}P_{0.75}S_4$ ("Thio-LISICON"), and $Li_2O$—$Al_2O_3$—$TiO_2$—$P_2O_5$ ("LATP"). In some embodiments, the lithium ion conductor may include an inorganic solid electrolyte added with $Li_3PO_4$, a halogen or a halogen compound. The inorganic compounds may have a crystalline, an amorphous, a glass or a glass-ceramic structure.

A material that allows reversible intercalation and deintercalation of lithium ions may be used as the positive electrode active material. In an embodiment, positive active materials include an oxide or a sulfide of at least one transition metal selected from manganese (Mn), cobalt (Co), nickel (Ni), iron (Fe) and aluminum (Al). In some embodiments, positive active materials may include lithium cobalt oxide ("LCO"), lithium nickel oxide, lithium nickel-cobalt oxide, lithium nickel-cobalt-aluminum oxide ("NCA"), lithium nickel-cobalt-manganese oxide ("NCM"), lithium manganese oxide, lithium iron phosphate, nickel sulfide, copper sulfide, sulfur, iron oxide and vanadium oxide. The positive active materials described above may be used individually or in a combination of at least two thereof.

In an embodiment, the positive electrode active material may be a lithium transition metal oxide that has a layered halite type structure among the positive electrode active material described above. Here, the term "layered" refers to a shape of thin sheet, and the term "halite type structure" refers to a sodium chloride type structure, which is a type of crystalline structures. In such an embodiment, face-centered cubic lattices, each formed by cations and anions, are dislocated from each other by about ½ of the edge of the unit lattice. In an embodiment, the lithium transition metal oxide having the layered halite type structure may include, for example, a lithium salt of a ternary transition metal oxide that is represented by $Li_{1-x-y-z}Ni_xCo_yAl_zO_2$ (NCA) or $Li_{1-x-y-z}Ni_xCo_yMn_zO_2$ (NCM) ($0<x<1$, $0<y<1$, $0<z<1$, and $x+y+z<1$).

The positive electrode layer binder may be, for example, a non-polar resin that does not have a polar functional group. Thus, the positive electrode layer binder is inactive with respect to a highly reactive solid electrolyte, e.g., to a sulfide-based solid electrolyte. In an embodiment, the positive electrode layer binder include, for example, styrene-based thermoplastic elastomers such as SBS block copolymer and SEBS block copolymer, and SSBS block; SBR, BR, NR, IR, EPDM, and a partial or complete hydrogenated product thereof. In some embodiments, the positive electrode layer binder may include, for example, polystyrene, a polyolefin, an olefin-based thermoplastic elastomer, a polycycloolefin, a silicone resin, and the like. In some embodiments, the positive electrode layer binder may include the first binder.

In such an embodiment, a highly reactive sulfide-based solid electrolyte is used as an electrolyte of the solid-state battery 1, and the positive electrode layer binder is a non-polar resin such as the first binder. In such an embodiment, direct bonding of the positive electrode layer 4 on the positive electrode current collecting member 2 may not be substantially strong. Therefore, in such an embodiment, the bonding layer 3 including the first and second binders is interposed between the positive electrode layer 4 and the positive electrode current collecting member 2. Accordingly, the first binder in the bonding layer 3 substantially strongly bonds to the positive electrode layer 4 and the second binder in the bonding layer 3 substantially strongly bonds to the positive electrode current collecting member 2, and thus the positive electrode current collecting member 2 and the positive electrode layer 4 are substantially strongly bound to each other. In an embodiment, where the positive electrode layer binder includes the first binder, the first binder in the bonding layer 3 and the first binder in the positive electrode layer 4 interdiffuse with each other across the interface between the bonding layer 3 and the positive electrode layer 4, and thus the bonding layer 3 is substantially strongly bound to the positive electrode layer 4.

In an embodiment, a content ratio of the sulfide-based solid electrolyte, the positive electrode active material, the positive electrode layer conductive material, and the positive electrode layer binder is not particularly limited. For example, the sulfide-based solid electrolyte may be in a range from about 20 wt % to about 50 wt %, the positive electrode active material may be in a range from about 45 wt % to about 75 wt %, the positive electrode layer conductive material may be in a range from about 1 wt % to about 10 wt %, and the positive electrode layer binder may be in a range from about 0.5 wt % to about 4 wt % with respect to a total weight of the positive electrode layer 4.

The electrolyte layer 5 includes at least a sulfide-based solid electrolyte. The electrolyte layer 5 may be formed by powder compression molding or by coating method.

The negative electrode layer 6 may include a negative electrode active material. In an embodiment, the negative electrode active material include, for example, a graphite active material (artificial graphite, natural graphite, a mixture thereof, or natural graphite coated with artificial graphite and the like), a mixture of silicon, tin, silicon oxide, or tin oxide particles and a graphite active material, particles of silicon or tin, an alloy having silicon or tin as its base material, and a titanium oxide-based compound such as $Li_4Ti_5O_{12}$. The negative electrode layer 6 may be formed by powder compression molding or by coating method.

In an embodiment, a conductor, e.g., an electric conductor, may be used as the negative electrode current collecting member 7. In one embodiment, for example, the negative electrode current collecting member 7 may be a conductor including plates or sheets made of aluminum (Al), stainless steel, a nickel-plated steel, indium (In), copper (Cu), magnesium (Mg), titanium (Ti), iron (Fe), cobalt (Co), nickel (Ni), zinc (Zn), germanium (Ge), lithium (Li), or an alloy thereof. In an embodiment, each of the layers constructing the solid-state battery 1 may include a known additive.

2. Method of Preparing a Solid-State Battery

Hereinafter, an embodiment of a method of preparing the solid-state battery according to the invention will be described. First, a bonding layer coating composition including the first binder, the second binder, the bonding layer conductive material, and a first solvent, which dissolves the first and second binders, is prepared. In an embodiment, the first solvent include, for example, an amide solvent, such as N-methyl pyrrolidone ("NMP"), N,N-dimethyl formamide ("DMF"), or N,N-dimetnyl acetamide ("DMAc"); an alkyl ester solvent, such as butyl acetate or ethyl acetate; a ketone solvent, such as acetone, methyl ethyl ketone, or methyl isobutyl ketone; an ether solvent, such as tetrahydrofuran ("THF") or diethyl ether; and an alcohol solvent, such as methanol, ethanol, or isopropyl alcohol. The bonding layer 3 does not include a sulfide-based solid electrolyte or only include a substantially small amount of the sulfide-based solid electrolyte that is swollen from the positive electrode layer 4, and thus the first solvent may be a polar solvent. In such an embodiment, the first solvent that dissolves the first and second binders is prepared, and then, the method of preparing the solid-state battery is performed using the first solvent.

Subsequently, the bonding layer coating composition is applied on the positive electrode current collecting member 2 and dried to form the bonding layer 3. In an alternative embodiment, a bonding film may be formed by coating and drying the bonding layer coating composition on a substrate, such as of a screen printer, and the bonding film thus obtained may be compressed on the positive electrode current collecting member 2.

Next, a positive electrode layer coating composition including the sulfide-based solid electrolyte, the positive electrode active material, the positive electrode layer conductive material, the positive electrode layer binder and a second solvent, which dissolves the positive electrode layer binder and the first binder, is prepared. The second solvent dissolves the positive electrode layer binder and the first binder but not the second binder. In one embodiment, the second solvent is a non-polar solvent. In an embodiment, the second solvent include, for example, aromatic hydrocarbons, such as xylene, toluene, or ethyl benzene; aliphatic hydrocarbons, such as pentane, hexane, or heptane. Subsequently, the positive electrode layer coating composition is applied on the boding layer 3 and dried to form the positive electrode layer 4 such that the first binder in the bonding layer 3 is dissolved by the second solvent and swollen into the positive electrode layer 4, bondage between the bonding layer 3 and the positive electrode layer 4 is thereby substantially strengthened. In such an embodiment, the second solvent does not dissolve the second binder, and thus, when the positive electrode layer coating composition is applied on the bonding layer 3, the second binder in the bonding layer 3 is effectively prevented from being swollen into the positive electrode layer 4. Accordingly, degradation of the sulfide-based solid electrolyte in the positive electrode layer 4 by the second binder is effectively prevented. Through the processes described above, a positive electrode structure including the positive electrode current collecting member 2, the bonding layer 3 and the positive electrode layer 4 is prepared.

Also, the electrolyte layer 5 and the negative electrode layer 6 are prepared, for example, by a powder compression molding. And then, the electrolyte layer 5 and the negative electrode layer 6 are pressed with the positive electrode structure on the negative electrode current collecting member 7 to obtain the solid-state battery 1.

EXAMPLES

Hereinafter, the invention will be described in further detail with reference to the following examples. These examples are for illustrative purposes only and are not intended to limit the scope of the invention. In each of the examples and comparative examples, all operations were all performed in a dry room at a temperature in a range of a dew point temperature to 55° C.

Example 1

Preparation of Bonding Layer

Graphite (KS-4, TIMCAL Graphite & Carbon, same hereinafter) and acetylene black (Denki Kagaku Kogyo, same hereinafter) as the binding layer conductive material, SBS elastomer (S.O.E S1611, Asahi Chemical Industry) as the first binder (hereinafter, referred to as "binder A"), and acid modified PVDF (KF 9200, KUREHA Chemical Industry) as the second binder (hereinafter, referred to as "binder B") were weighed in a wt % ratio of 60:10:15:15, added to a rotation and revolution mixer with an appropriate amount of NMP, and stirred at a rate of 3000 revolutions per minute (rpm) for 5 minutes to prepare a bonding layer coating composition.

Next, an aluminum foil current collecting member with a thickness of about 20 micrometers (μm) as the positive electrode current collecting member 2 was placed on a tabletop screen printer (Neuron Ring Precision Industry), and then the bonding layer coating composition was applied on the aluminum foil current collecting member using 400 mesh screen. Then, the positive electrode current collecting member 2 coated with the bonding layer coating composition was vacuum-dried at a temperature of 80° C. for 12 hours such that the bonding layer 3 was formed on the positive electrode current collecting member 2. A thickness of the bonding layer 3 after the vacuum-drying was about 7 μm.

Preparation of Positive Electrode Layer

LiNiCoAlO$_2$ ternary powders as the positive electrode active material, amorphous powders of Li$_2$S—P$_2$S$_5$ (80:20 mole percent or mol %) as the sulfide-based solid electrolyte, vapor-grown carbon fiber powders as the conductive material (the positive electrode layer conductive material) were weighed in a wt % ratio of 60:35:5 and mixed using a rotation and revolution mixer.

Subsequently, a xylene solution, in which hydrogenated NBR (THERBAN A3907, LANXESS) as the positive electrode layer binder (hereinafter, referred to as "binder C") was dissolved, was added to the mixed powders to provide 1 wt % of the binder C with respect to a total weight of the mixed powders, and thus a primary mixed composition is prepared. Also, a xylene solution, in which the binder A was dissolved as the positive electrode layer binder, was added to the primary mixed composition to provide 0.5 wt % of the binder A with respect to a total weight of the mixed powders, and thus a secondary mixed composition was prepared. Also, an appropriate amount of dewatered xylene was added to the secondary mixed composition for controlling viscosity, and thus a tertiary mixed composition was prepared. Also, zirconia balls with a diameter of 5 millimeters (mm) were added to the tertiary mixed composition to increase dispersivity of the mixed powders so that each of empty space, the mixed powders, and the zirconia balls occupy a third of a whole volume of the milling container, and thus a quaternary mixed composition was prepared. The quaternary mixed composition was added to a rotation and revolution mixer and stirred at a rate of 3000 rpm for 3 minutes to prepare a positive electrode layer coating composition.

Next, a sheet formed of the positive electrode current collecting member 2 and the bonding layer 3 was placed on a tabletop screen printer, and then the positive electrode layer coating composition was applied on the sheet using a metal mask with a thickness of about 150 μm. Then, the sheet coated with the positive electrode layer coating composition was dried on a hot plate at a temperature of 40° C. for 10 minutes and then vacuum-dried a temperature of 40° C. for 12 hours such that the positive electrode layer 4 was formed on the bonding layer 3. A total thickness of the positive electrode current collecting member 2, the bonding layer 3 and the positive electrode layer 4 was about 165 μm.

Then, the sheet formed of the positive electrode current collecting member 2, the bonding layer 3, and the positive electrode layer 4 was rolled using a roll-press with a roll gap of about 10 μm to prepare a positive electrode structure. A thickness of the positive electrode structure was about 120 μm. The prepared positive electrode structure was punched to obtain a circular structure with a diameter of about 13 mm, and the circular structure was used in the preparation of a solid-state battery. A density of the positive structure, e.g., an electrode density, was about 2.96 grams per centimeter cubed (g/cc).

Preparation of Solid-State Battery 70 milligrams (mg) of amorphous powders of Li$_2$S—P$_2$S$_5$ (80:20 mol %) as a solid electrolyte was weighed and filled in a polypropylene insulator container with an inner diameter of 13 mm. Then, Li$_2$S—P$_2$S$_5$ powders were compression-molded using a molding device with a diameter of 13 mm to form the electrolyte layer 5. Next, about 15 mg of graphite powders vacuum-dried at a temperature of 80° C. for 24 hours as the negative electrode active material was filled at the upper side of the electrolyte layer 5 and compression-molded substantially in the same manner as described above used to form the negative electrode layer 6.

Subsequently, the positive electrode structure was filled on an opposite side of the electrolyte layer 5, and both ends of the polypropylene insulator container was sealed with stainless steel pins with a diameter of 13 mm. Next, the polypropylene insulator container was maintained at a pressure of about 4 tons per square meter (t/m$^2$) for 10 minutes to form an integrally molded structure. Then, the integrally molded structure was maintained at a pressure of about 3 kilonewtons per square meter (kN/m$^2$), and vacuum-laminated to prepare the solid-state battery 1.

Example 2

A solid-state battery 1 was prepared substantially in the same manner as in Example 1, except that the xylene solution of the binder A was added to the mixed powders to provide 2.0 wt % of the binder A with respect to a total weight of the mixed powders in the preparation process of the positive electrode layer. Also, a density of the positive structure, e.g., an electrode density, was about 1.93 g/cc.

Example 3

A solid-state battery 1 was prepared substantially in the same manner as in Example 1, except that the xylene solution of the binder C was added to the mixed powders to provide 2.0 wt % of the binder C with respect to a total weight of the mixed powders in the preparation process of the positive electrode layer. Also, a density of the positive structure, e.g., an electrode density, was about 1.53 g/cc.

Comparative Example 1

Preparation of Positive Electrode Layer

LiNiCoAlO$_2$ ternary powders as the positive electrode active material, amorphous powders of Li$_2$S—P$_2$S$_5$ (80:20 mol %) as the sulfide-based solid electrolyte, vapor-grown carbon fiber powders as the conductive material (the positive electrode layer conductive material) were weighed in a wt % ratio of 60:35:5 and mixed using a rotation and revolution mixer.

Subsequently, a xylene solution of the binder A (the positive electrode layer binder) was added to the mixed powders to provide 2.0 wt % of the binder A with respect to a total weight of the mixed powders, and thus a primary mixed composition is prepared. Also, an appropriate amount of dewatered xylene was added to the primary mixed composition for controlling viscosity, and thus a secondary mixed composition was prepared. Also, zirconia balls with a diameter of 5 mm were added to the secondary mixed composition to increase dispersivity of the mixed powders such that each of empty space, the mixed powders and the zirconia balls occupy a third of a whole volume of the milling container, and thus a tertiary mixed composition is prepared. The tertiary mixed composition was added to a rotation and revolution mixer and stirred at a rate of 3000 rpm for 3 minutes to prepare a positive electrode layer coating composition.

Next, an aluminum foil current collecting member (also referred to as "a sheet") with a thickness of about 20 μm was placed on a tabletop screen printer, and then the positive electrode layer coating composition was applied on the sheet using a metal mask with a thickness of about 150 μm. Then, the sheet coated with the positive electrode layer coating composition was dried on a hot plate at a temperature of 40° C. for 10 minutes and then vacuum-dried at a temperature of 40° C. for 12 hours. By this, the positive electrode layer was formed on the positive electrode current collecting member. A total thickness of the positive electrode current collecting member and the positive electrode layer was about 135 μm.

Then, the sheet formed of the positive electrode current collecting member and the positive electrode layer was rolled using a roll-press with a roll gap of about 10 μm. However, the positive electrode layer was peeled off from the positive electrode current collecting member such that preparation and evaluation of a solid-state battery were not performed in Comparative Example 1.

Comparative Example 2

Preparation of Positive Electrode Layer

LiNiCoAlO$_2$ ternary powders as the positive electrode active material, amorphous powders of Li$_2$S—P$_2$S$_5$ (80:20 mol %) as the sulfide-based solid electrolyte, vapor-grown carbon fiber powders as the conductive material (the positive electrode layer conductive material) were weighed in a wt % ratio of 60:35:5 and mixed using a rotation and revolution mixer.

Subsequently, an NMP solution of the binder B (the second binder) was added to the mixed powders to provide 2.0 wt % of the binder B with respect to a total weight of the mixed powders, and thus a primary mixed composition is prepared. Also, an appropriate amount of NMP solvent was added to the primary mixed composition for controlling viscosity, and thus a secondary mixed composition was prepared. Also, zirconia balls with a diameter of 5 mm were added to the secondary mixed composition to increase dispersivity of the mixed powders such that each of empty space, the mixed powders and the zirconia balls occupy a third of a whole volume of the milling container, and thus a tertiary mixed composition is prepared. The tertiary mixed composition was added to a rotation and revolution mixer and stirred at a rate of 3000 rpm for 3 minutes to prepare a positive electrode layer coating composition.

Next, an aluminum foil current collecting member (also referred to as "a sheet") with a thickness of about 20 μm was placed on a tabletop screen printer, and then the positive electrode layer coating composition was applied on the sheet using a metal mask with a thickness of about 150 μm. Then, the sheet coated with the positive electrode layer coating composition was dried on a hot plate at a temperature of 80° C. for 10 minutes and then vacuum-dried a temperature of 80° C. for 12 hours. By this, the positive electrode layer was formed on the positive electrode current collecting member. A total thickness of the positive electrode current collecting member and the positive electrode layer was about 135 μm.

Then, the sheet formed of the positive electrode current collecting member and the positive electrode layer was rolled using a roll-press with a roll gap of about 10 μm, and then a positive electrode structure was prepared. A thickness of the positive electrode structure was about 110 μm. The prepared positive electrode structure was punched to obtain a circular structure with a diameter of 13 mm, and the circular structure was used in the preparation of a solid-state battery in the same manner as in Example 1. A density of the positive structure, e.g., an electrode density, was about 2.65 g/cc.

Impedance Measurement

The solid-state batteries obtained above were charged in a constant-temperature container maintained at 25° C. with a current density of 0.05 milliampere per square centimeter (mA/cm$^2$) until the voltages of the solid-state batteries reached 4 volts (V). Then, real parts of the impedances Z' (Ohm: Ω) measured at a frequency of 1 kilohertz (kHz) in the constant-temperature container maintained at 25° C. were selected as the resistances of the solid-state batteries. The measurement was performed by using an impedance analyzer (AUTOLAB).

Evaluation

Figure 2:
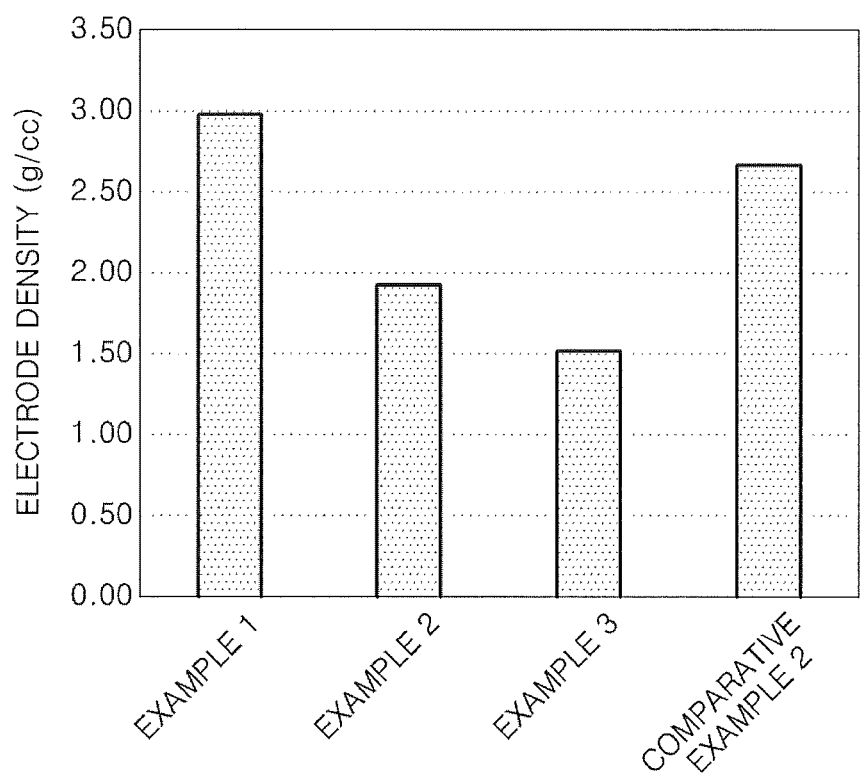
FIG. 2 is a graph illustrating electrode densities of Examples 1 to 3 and Comparative Example 2.
Figure 3:
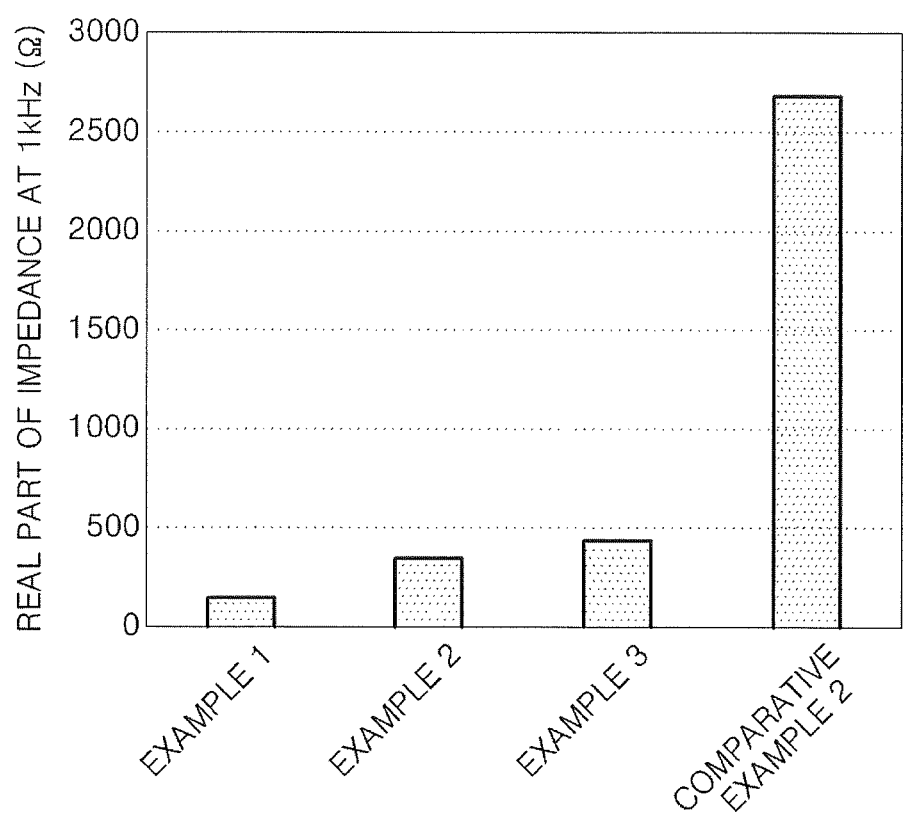
FIG. 3 is a graph illustrating real parts of impedances of Examples 1 to 3 and Comparative Example 2.

FIG. 2 illustrates electrode densities of Examples 1 to 3 and Comparative Example 2. FIG. 3 illustrates and compares the real parts of impedances Z' of Examples 1 to 3 and Comparative Example 2. Referring to FIGS. 2 and 3, the electrode densities of Examples 1 to 3 are substantially similar to or less than the electrode density of Comparative Example 2, while the real parts of the impedances Z' of Examples 1 to 3 are significantly smaller than the real part of the impedance Z' of Comparative Example 2. That is, characteristics of the solid-state batteries of Examples 1 to 3 are substantially improved when compared with the solid-state battery of Comparative Example 2.

In Comparative Example 2, the positive electrode layer includes the second binder, and thus the sulfide-based solid electrolyte in the positive electrode layer may degrade. In Examples 1 to 3, swelling of the second binder to the positive electrode layer 4 is effectively prevented, and thus degradation of the sulfide-based solid electrolyte is effectively prevented. Also, in Examples 1 to 3, the first binder in the bonding layer is substantially strongly bound to the positive electrode layer 4, and the second binder in the bonding layer is substantially strongly bound to the positive electrode current collecting member. Therefore, the positive electrode current collecting member 2 and the positive electrode layer 4 are substantially strongly bound such that characteristics of the solid-state batteries of Examples 1 to 3 are substantially improved when compared with the solid-state battery 1 of Comparative Example 2. Table 1 shows the materials and evaluation results of Examples 1 to 3 and Comparative Examples 1 and 2.

TABLE 1

|  |  | Example 1 | Example 2 | Example 3 | Comparative Example 1 | Comparative Example 2 |
|---|---|---|---|---|---|---|
| Bonding layer | First binder | Binder A | Binder A | Binder A | — | — |
|  | Second binder | Binder B | Binder B | Binder B | — | — |
| Positive electrode layer | Positive electrode layer binder | Binder A (0.5) Binder C (1.0) | Binder A (2.0) | Binder C (2.0) | Binder A (2.0) | — |
|  | Second binder | — | — | — | — | Binder B (2.0) |
| Solvent of positive electrode layer coating composition |  | Dewatered xylene | Dewatered xylene | Dewatered xylene | Dewatered xylene | NMP |
| Electrode peeling |  | No | No | No | Yes | No |
| Electrode density(g/cc) |  | 2.96 | 1.93 | 1.53 | — | 2.65 |
| Real part Z' (Ω) of Impedance at 1 kHz |  | 156 | 362 | 464 | — | 2664 |

* Numbers in parentheses indicate wt % in Table 1.

As described above, according to the one or more embodiments of the invention, the positive electrode 10 includes the bonding layer 3 and the positive electrode layer 4. The bonding layer 3 includes the first binder that bonds to the positive electrode layer 4, the second binder that has a stronger bonding strength to the positive electrode current collecting member 2 than the bonding strength of the first binder, and the bonding layer conductive material. In such an embodiment, the bonding layer 3 is interposed between the positive electrode current collecting member 2 and the positive electrode layer 4. In an embodiment, the binder of the positive electrode layer 4 is the first binder, which is inactive to the sulfide-based solid electrolyte. Thus, in such an embodiment, the positive electrode 10 effectively prevents degradation of the sulfide-based solid electrolyte in the positive electrode layer 4, and the positive electrode 10 is thereby substantially strongly bound to positive electrode current collecting member 2.

In an embodiment, the positive electrode layer binder includes the first binder. Thus, the first binder in the bonding layer 3 and the first binder in the positive electrode layer 4 interdiffuse with each other across the interface between the bonding layer 3 and the positive electrode layer 4, and thus the bonding layer 3 is substantially strongly bound to the positive electrode layer 4.

In an embodiment, the first binder may include a non-polar resin which does not have a polar functional group, thus the first binder may be substantially strongly bound to the positive electrode layer, and the degradation of the sulfide-based solid electrolyte is effectively prevented.

In an embodiment, the second binder may include a polar resin which has a polar functional group, thus the second binder is substantially strongly bound to the positive electrode current collecting member 2.

In an embodiment, the solid-state battery 1 includes the positive electrode 10 described above, and characteristics of the solid-state battery 1 is substantially improved. An embodiment of the method of preparing the solid-state battery 1 according to the invention includes preparing bonding layer and preparing the positive electrode layer. In such an embodiment, the preparing of the bonding layer includes coating and drying the bonding layer coating composition, which includes the first binder, the second binder, the bonding layer conductive material and the first solvent, on the positive electrode current collecting member 2 to provide the bonding layer 3. In such an embodiment, the preparing of the positive electrode layer includes coating and drying the positive electrode layer coating composition, which includes the solid electrolyte, the positive electrode active material, the positive electrode layer conductive material, the positive electrode layer binder, and the second solvent, on the bonding layer to provide the positive electrode layer 4. The second solvent dissolves the first binder. Thus, when the positive electrode layer coating composition is applied, the first binder in the bonding layer 3 is dissolved in the second solvent and swollen into the positive electrode layer 4, thus bondage between the bonding layer 3 and the positive electrode layer 4 is substantially strengthened.

It should be understood that the exemplary embodiments described herein should be considered in a descriptive sense only and not for purposes of limitation. Descriptions of features or aspects within each embodiment should typically be considered as available for other similar features or aspects in other embodiments. For example, the bonding layer 3 is interposed between the positive electrode current collecting member 2 and the positive electrode layer 4 in the embodiments of the invention, but the bonding layer 3 may be interposed between the negative electrode current collecting member 7 and the negative electrode layer 6. In this case, the negative electrode layer 6 may have the same construction with the positive electrode layer 4.

What is claimed is:

1. An electrode for solid-state batteries, the electrode comprising:
   a current collecting member; an electrode layer bound on the current collecting member; and a bonding layer interposed between the electrode layer and the current collecting member, and bound to the electrode layer, wherein the electrode layer comprises: a solid electrolyte; an electrode layer binder which is inactive to the solid electrolyte; and an electrode active material, wherein the bonding layer comprises: a first binder which is inactive to the solid electrolyte; a second binder which has a stronger bonding strength to the current collecting member than a bonding strength of the first binder to the current collecting member; where the first binder and the second binder are intermixed where both the first binder and the second binder contact the current collecting member; and a bonding layer conductive material, wherein the first binder of the bonding layer binds with the electrode layer; wherein the first binder is present in a range from about 3 wt % to about 30 wt %, and the second binder is present in a range from about 2 wt % to about 20 wt % with respect to a total weight of the bonding layer.

2. The electrode for solid-state batteries of claim 1, wherein the electrode layer binder comprises the first binder.

3. The electrode for solid-state batteries of claim 1, wherein the first binder comprises a non-polar resin which does not have a polar functional group.

4. The electrode for solid-state batteries of claim 1, wherein the second binder comprises a polar resin which has a polar functional group.

5. The electrode for solid-state batteries of claim 1, wherein the solid electrolyte comprises a sulfide-based solid electrolyte.

6. The electrode for solid-state batteries of claim 1, wherein the electrode layer further comprises an electrode layer conductive material.

7. A solid-state battery comprising: a positive electrode comprising a positive electrode active material; a negative electrode comprising a negative electrode active material; and a solid electrolyte layer disposed between the positive electrode and the negative electrode, wherein at least one of the positive electrode and the negative electrode comprises: a current collecting member; an electrode layer bound on the current collecting member; and a bonding layer interposed between the electrode layer and the current collecting member, and bound to the electrode layer, wherein the electrode layer comprises: a solid electrolyte; an electrode layer binder which is inactive to the solid electrolyte; and an electrode active material, wherein the bonding layer comprises: a first binder which is inactive to the solid electrolyte; a second binder which has a stronger bonding strength to the current collecting member than a bonding strength of the first binder to the current collecting member; where the first binder and the second binder are intermixed where both the first binder and the second binder contact the current collecting member; a bonding layer conductive material, wherein the first binder of the bonding layer binds with the electrode layer; wherein the first binder is present in a range from about 3 wt % to about 30 wt % and the second binder is present in a range from about 2 wt % to about 20 wt % with respect to a total weight of the bonding layer.

8. The solid-state battery of claim 7, wherein the electrode layer binder comprises the first binder.

9. The solid-state battery of claim 7, wherein the first binder comprises a non-polar resin, which does not have a polar functional group.

10. The solid-state battery of claim 7, wherein the second binder comprises a polar resin, which has a polar functional group.

11. The solid-state battery of claim 7, wherein the solid electrolyte comprises a sulfide-based solid electrolyte.

12. The solid-state battery of claim 7, wherein the electrode layer further comprises an electrode layer conductive material.

13. The solid-state battery of claim 7, wherein the solid-state battery is an all-solid secondary battery.

14. A bonding film for a solid-state battery comprises: a first binder which is inactive to a solid electrolyte of an electrode layer of the solid-state battery; a second binder which has a stronger bonding strength to a current collecting member of the solid-state battery than a bonding strength of the first binder to the current collecting member; where the first binder and the second binder are intermixed where both the first binder and the second binder contact the current collecting member; a bonding layer conductive material, wherein the bonding film is bound to the electrode layer comprising the solid electrolyte, a binder, which is inactive to the solid electrolyte, and an electrode active material, and the bonding film is interposed between the electrode layer and the current collecting member of the solid-state battery, wherein the first binder binds with the electrode layer; wherein the first binder is present in a range from about 3 wt % to about 30 wt %, and the second binder is present in a range from about 2 wt % to about 20 wt % with respect to a total weight of the bonding layer.

15. The bonding film for solid-state batteries of claim 14, wherein the solid electrolyte comprises a sulfide-based solid electrolyte.

16. The bonding film for solid-state batteries of claim 14, wherein the electrode layer further comprises an electrode layer conductive material.

* * * * *